United States Patent [19]

Camp

[11] 4,294,069
[45] Oct. 13, 1981

[54] EXHAUST NOZZLE CONTROL AND CORE ENGINE FUEL CONTROL FOR TURBOFAN ENGINE

[75] Inventor: Vann T. Camp, Jupiter, Fla.

[73] Assignee: United Technologies Corporation, Hartford, Conn.

[21] Appl. No.: 900,384

[22] Filed: Apr. 26, 1978

[51] Int. Cl.$^2$ .................... F02K 11/00; F02C 9/04
[52] U.S. Cl. ....................................... 60/238; 60/239; 60/226 R
[58] Field of Search .............. 60/235, 236, 237, 238, 60/239, 226

[56] References Cited

U.S. PATENT DOCUMENTS

| | | | |
|---|---|---|---|
| 3,401,524 | 9/1968 | Urban | 60/239 |
| 3,797,233 | 3/1974 | Webb et al. | 60/238 |
| 3,854,287 | 12/1974 | Rembold | 60/238 |
| 4,095,420 | 6/1978 | Abernethy et al. | 60/236 |
| 4,159,625 | 7/1979 | Kerr | 60/238 |

Primary Examiner—Robert E. Garrett
Attorney, Agent, or Firm—Norman Friedland

[57] ABSTRACT

This control serves to optimize thrust during steady state and transient operation modes of a turbofan engine of the mixed flow type by adjusting or trimming the exhaust nozzle area as a function of fan pressure ratio and fan rotor speed and by adjusting or trimming the core engine fuel flow as a function of fan rotor speed and/or turbine inlet temperature. The control serves to enhance stability by assuring airflow in the engine and its inlet is within a given value avoiding inlet buzz and high distortion to the engine and avoiding even transient operation in conditions that might cause compressor flow instability or stall. Fuel flow is adjusted or trimmed as a function of fan rotor speed or turbine inlet temperature limits depending on which is calling for the least amount of fuel.

2 Claims, 1 Drawing Figure

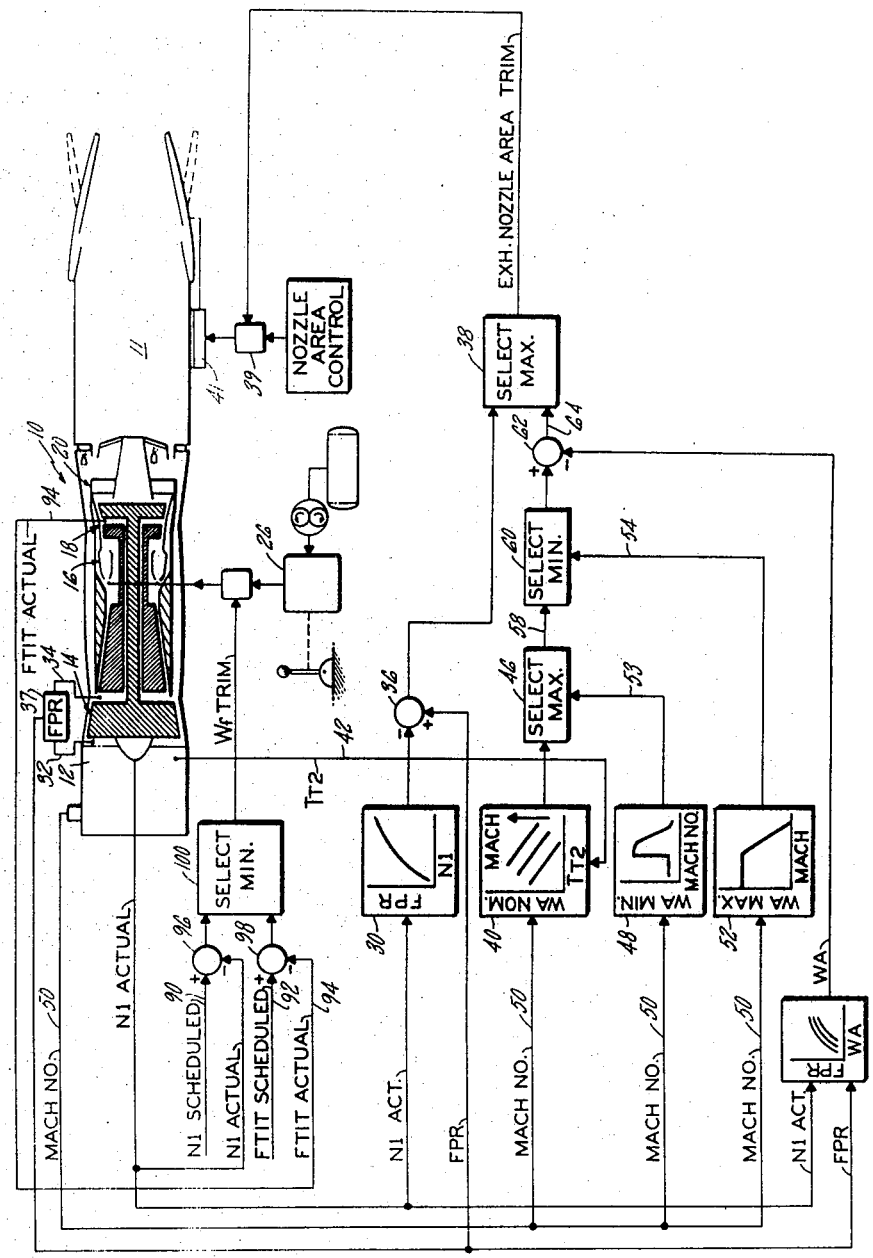

EXHAUST NOZZLE CONTROL AND CORE ENGINE FUEL CONTROL FOR TURBOFAN ENGINE

BACKGROUND OF THE INVENTION

This invention relates to turbofan engines and particularly to the exhaust nozzle control and to the core engine fuel control for optimizing thrust during steady state or transient conditions especially when the area of the exhaust nozzle is being selected for a given flight mode, as for example thrust augmentation by a thrust augmentor.

As is well known in the art, it is abundantly important for aircraft efficiency, specific fuel consumption and the like to achieve maximum thrust for a given flight mode. Since thrust cannot be measured directly, many attempts have been made to simulate or calculate thrust by measuring certain core engine operating parameters. Not only do such systems require instrumentation located in critical core engine locations, which may be undesirable, the smaller the tolerance band approximating the actual thrust being developed the more accurate the control will be, and the heretofore systems do not lend themselves to hold a small tolerance band.

I have found that I can achieve the highest thrust possible while being consistent with turbine temperature limits, fan flow stability limits and aircraft air inlet limits by closing the loop on different engine parameters in different regimes of the engines operational environment. This control operates in three preferred modes, namely, subsonic, transonic and supersonic. In the subsonic aircraft flight regime the loop is closed on fan pressure ratio by adjusting or trimming engine exhaust nozzle area. The loop is closed on fan rotor speed by adjusting or trimming core engine fuel flow. In the transonic aircraft flight regime the loop is closed on fan pressure ratio by adjusting exhaust nozzle area. The loop is closed on maximum turbine inlet temperature consistent with engine durability limits by adjusting core engine fuel flow. In the supersonic aircraft flight regime the loop is closed on engine airflow by adjusting engine exhaust nozzle area. The loop is closed on turbine inlet temperature by adjusting core engine fuel flow. It is to be understood that the terms subsonic, transonic and supersonic flight regimes only approximate the control's transitions between modes. The determination of the particular control mode is embodied in the invention and is a function of both aircraft and engine operating conditions. The transitions between the controls preferred modes occur without step changes in engine conditions. In both the exhaust nozzle area and core engine fuel flow control loops the smooth transitions are provided by selecting the maximum or minimum (as the case may be) error signals provided by the control logic. The transitions between the modes recognizes the interactions of engine and aircraft characteristics which combine to provide the resultant thrust; optimum thrust resulting in optimum aircraft performance.

SUMMARY OF THE INVENTION

An object of this invention is to provide for a turbofan engine with a variable area exhaust nozzle improved control means for maximizing thrust by trimming the area of the exhaust nozzle as a function of fan pressure ratio or fan airflow and fan rotor speed, and by trimming the core engine fuel flow as a function of fan rotor speed or turbine inlet temperature.

A feature of this invention is to provide in a control means for operating the engine at its limits so that both exhaust nozzle area and primary fuel flow cause the engine to perform at some operational limit. The control assures that optimization of thrust is consistent with airflow stability limits within the core engine, fan and inlet to engine and consistent with engine safety and durability limits.

Another feature of the invention is that transient excursions from the desired engine performance are minimized. External disturbances causing variations in indicators of compressor stability are directly measured by the FPR loop in the control thus allowing the control to take immediate action to preclude compressor flow instability or stall.

Other features and advantages will be apparent from the specification and claims and from the accompanying drawings which illustrate an embodiment of the invention.

BRIEF DESCRIPTION OF THE DRAWING

The sole FIGURE is a schematic and block diagrammatic illustration of this invention.

DESCRIPTION OF THE PREFERRED EMBODIMENT

While this invention is particularly efficacious for a turbofan engine with afterburner, it is to be understood that any turbofan engine with a variable area exhaust nozzle could equally utilize this control. The control of this invention as one skilled in the art will appreciate constitutes only a portion of the overall control mode for the engine. For example, acceleration, deceleration, engine start-up and the like would be controlled by other control means. Thus, this invention could either be ancillary to an engine and fuel control or it could be incorporated into such controls and, hence, made integral therewith.

As can be seen by referring to FIGS. 1 and 2, the engine generally represented by reference numeral 10 is a twin-spool axial compressor type engine with a thrust augmentator 11. When mounted in an aircraft, a suitable inlet 12 would lead airflow into the fan/compressor 14 where a portion is bypassed and the remaining portion is admitted into the core engine. This air is further compressed by the high compressor, fuel is burned in the burner section 16, and the heated air feeds the turbine section 18 for driving the fan/compressor, high compressor and develops thrust in the conventional manner. Also, conventionally provided with the thrust augmentor is a fuel system 20 and a variable area nozzle 22.

As noted from the sole FIGURE, a fuel control generally illustrated by reference numeral 26 serves to regulate the fuel to the engine in a well known manner. A typical fuel control, for example, could be the JFC-25 or JFC-60, manufactured by the Hamilton Standard Division of United Technologies Corporation, the assignee of this application, and it would provide the necessary functions to achieve automatic engine operation. The control mode described in this invention is intended to be ancillary to the typical control and would serve as a means of optimizing engine performance such as a supervisory control does as is disclosed in U.S. Pat. No. 3,797,233, granted to William L. Webb, et al, May 19, 1974, and also assigned to the same assignee and incorporated herein by reference.

In accordance with this invention, the fan is "matched" by controlling the fan pressure ratio (PR) and rotor speed (N). Hence, as represented by box 30, which is a suitable function generator, fan/compressor speed ($N_1$) is sensed and generates a signal that is indicative of the maximum PR that can be tolerated with stable operation. It will be noted that at certain flight conditions the maximum PR will produce the maximum engine thrust.

Suitable sensors 32 and 34 sense the pressure across the fan and these values are computed by a suitable divider 37 for producing a signal indicative of the pressure ratio (PR). Obviously, probe 34 may be located anywhere downstream of the fan/compressor 14 and produce a signal, when taken with the upstream probe, indicative of PR. Also sensors 32 and 34 could both be located downstream of the fan, as long as the pressures measured are uniquely correlatable to fan pressure ratio.

The output of the scheduled or desired PR and the actual PR are summed in summer 36 and the error signal is transmitted to the maximum selector 38. Under certain operating conditions, this signal will be passed through to the exhaust area controller 39 where it will trim the normal exhaust area control signal so as to maximize thrust. Hence, controller 39 will respond by controlling actuator 41 which in turn positions the nozzles 22 so long as the flow in the engine and inlet are within the stability limits as will be described below. The exhaust area nozzle will close the loop on fan pressure ratio. This effect of desired fan (PR) as a function of $N_1$ is to assure that compressor stability is achieved while exhaust nozzle area is trimmed to obtain optimum thrust.

Function generator 40 sensing compressor inlet temperature ($T_{T2}$) via sensor 42 produces a signal indicative of the optimal airflow for the engine. The additional input of aircraft Mach number via sensor 50 biases the engine optimal airflow to account for aircraft velocity effects. (Aircraft Mach number sensors are well known and commercially available). The output is transmitted to a maximum selector 46. Function generator 48 sensing Mach number through Mach number sensor 50 produces an output signal 53 indicative of the minimum airflow accepted in the inlet consistent with stability. Obviously, any airflow under the curve in boy 48 would produce "inlet buzz". Function generator 52, also sensing Mach number, produces an output signal 54 indicative of maximum airflow that the engine can tolerate without incurring high distortions to the engine. The output 53 of minimum inlet airflow limit generated by function generator 48 is transmitted to the maximum selector 46 and the higher of these two signals that is, optimal operating airflow produced by function generator 40, is the output 58 applied as the input to minimum selector 60. Minimum selector 60 selects the lower value of the output 58 and the output 54 and applies this signal to the summer 62. This signal is indicative of the airflow desired for optimum engine performance after application of air inlet constraints. The summer 62 adds the sensed airflow (f(N, PR)) and produces output 64 which in turn is applied to the maximum selector 38 for adjusting or trimming the exhaust nozzle area. In certain operating conditions this signal is transmitted through the maximum selector 38 and will trim exhaust nozzle area to optimize thrust.

The effect of the optimal operating airflow and inlet limits is to assure that airflow stability is achieved while the exhaust nozzles are trimmed to obtain maximum thrust. Thus, the airflow will be at a value that falls within the corridor of acceptable stable airflow defined between the maximum and minimum airflow inlet limits as noted in the graphs in function generators 48 and 52. This mode of operation is particularly efficacious for supersonic flight.

To achieve the fan airflow limit and turbine temperature limit, a reference $N_1$ represented by line 90 is summed with actual $N_1$ and the fuel flow dictated by the nominal fuel control is trimmed to maintain the selected or referenced speed. Likewise, a desired fan/compressor turbine inlet temperature is referenced represented by line 92 and is summed at summing junction 98 with actual Ftit schematically shown as line 94 to similarly trim fuel flow. Hence, the output of summers 96 and 98 produce signals indicative of fan airflow limit error and turbine temperature limit error, respectively, then apply them to a minimum selector 100 which transmits the lower of the two values to adjust fuel flow. In this manner, the fuel flow is adjusted for maximum thrust consistent with turbine durability which is particularly efficacious during transonic and supersonic flight modes.

As was the case of the exhaust area nozzle control, the primary fuel flow control serves to maximize thrust consistent with good airflow stability in the engine and inlet. The control mode serves to operate the engine at its limit thus giving maximum thrust. Also, it will be appreciated that this control mode automatically compensates for high spool efficiency deterioration, high spool power extraction, high spool speed-flow variations, high compressor discharge bleed, high compressor variable geometry mis-scheduling, and variations in core engine performance caused by aircraft altitude and Mach number changes.

It should be understood that the invention is not limited to the particular embodiments shown and described herein, but that various changes and modifications may be made without departing from the spirit or scope of this novel concept as defined by the following claims.

I claim:

1. A system for optimizing thrust of a gas turbine engine for powering aircraft having a variable area exhaust nozzle while maintaining airflow through the engine within its stable limits, and having independent fuel control means and independent nozzle area control means comprising:

means responsive to rotational speed of said engine for generating a signal for a desired engine pressure ratio, means responsive to actual pressure ratio for producing a signal indicative of the error between the actual pressure ratio and desired pressure ratio signal, nozzle area actuator means controlled by said independent nozzle area control responding to said error to further adjust the area of the exhaust nozzle, means for maintaining the proper amount of airflow in the engine and its inlet to achieve stable engine operations including, means for selecting the maximum value of a desired airflow signal generated as a function of Mach No. and engine inlet temperature and a minimum inlet airflow schedule generated as a function of Mach No. for producing a first output signal, means for selecting the minimum value of said first output signal and a maximum inlet airflow schedule generated as a function of Mach No. for producing a second output signal, means for measuring the airflow in said engine for producing an airflow signal, means summing said second output signal and said airflow signal for producing an error for further adjusting said exhaust nozzle area, a maximum selector for selecting the higher value of said error of said pressure ratio signal and said error of said airflow signal, and means for trimming the independent fuel control means as a function of the difference between a scheduled engine rotational speed and the actual engine rotational speed.

2. A system as in claim 1 including means responsive to the difference between turbine inlet temperature selected and measured for further limiting the fuel flow controlled by said independent fuel control.

* * * * *